United States Patent
Berthou et al.

(10) Patent No.: US 8,098,175 B2
(45) Date of Patent: Jan. 17, 2012

(54) AIRCRAFT INSTRUMENT PANEL

(75) Inventors: Nicolas Berthou, Aze (FR); Bruno Aymeric, St Medard En Jalles (FR); Jean-Yves Favard, St Medard En Jalles (FR)

(73) Assignee: Thales (FR)

( * ) Notice: Subject to any disclaimer, the term of this patent is extended or adjusted under 35 U.S.C. 154(b) by 1262 days.

(21) Appl. No.: 10/531,081

(22) PCT Filed: Oct. 23, 2003

(86) PCT No.: PCT/EP03/50751
§ 371 (c)(1),
(2), (4) Date: Oct. 31, 2005

(87) PCT Pub. No.: WO2004/037643
PCT Pub. Date: May 6, 2004

(65) Prior Publication Data
US 2006/0164260 A1    Jul. 27, 2006

(30) Foreign Application Priority Data

Oct. 25, 2002 (FR) ...................................... 02 13405

(51) Int. Cl.
*G08B 21/00* (2006.01)
(52) U.S. Cl. ........ 340/945; 340/967; 340/971; 340/973; 340/979
(58) Field of Classification Search .................... 340/945
See application file for complete search history.

(56) References Cited

U.S. PATENT DOCUMENTS

| | | | | |
|---|---|---|---|---|
| 6,057,786 A | * | 5/2000 | Briffe et al. | 340/975 |
| 6,281,810 B1 | * | 8/2001 | Factor | 340/971 |
| 6,784,869 B1 | * | 8/2004 | Clark et al. | 345/156 |

(Continued)

FOREIGN PATENT DOCUMENTS

GB    2 107 059 A    4/1983

OTHER PUBLICATIONS

Morgan J et al "Md-11 Electronic Instrument System" Proceedings of the digital avionics systems conference, Seatle, Oct. 5-8, 1992, New York, IEEE, US Oct. 5, 1992.

*Primary Examiner* — George Bugg
*Assistant Examiner* — Kerri McNally
(74) *Attorney, Agent, or Firm* — Lowe Hauptman Ham & Berner, LLP

(57) ABSTRACT

The invention relates to aircraft instrument panel equipment. According to the invention, the proposal is for an instrument panel which, in addition to a main display system for horizon and necessary piloting parameters, comprises two items of equipment identical from the point of view of hardware and the point of view of software, each provided with a display screen, automatic pilot set point adjustment buttons, computing means and standby data (standby horizon, altitude, speed). In normal operating conditions, one of the items of equipment is configured in an "automatic pilot set point display" mode; its control buttons are used to give the set points to the automatic pilot computer, and the set points are displayed on the screen. The other item of equipment is configured in "integrated standby data display" mode. It displays on the screen the standby horizon, the standby speed and the standby altitude. The mode may be switched at will or in the event of a failure of one of the two items of equipment.

19 Claims, 4 Drawing Sheets

U.S. PATENT DOCUMENTS

| | | | |
|---|---|---|---|
| 6,803,860 B1 * | 10/2004 | Langner et al. | 340/971 |
| 6,832,138 B1 * | 12/2004 | Straub et al. | 701/3 |
| 6,842,122 B1 * | 1/2005 | Langner et al. | 340/945 |
| 6,867,711 B1 * | 3/2005 | Langner et al. | 340/979 |
| 6,946,976 B1 * | 9/2005 | Langner et al. | 340/971 |
| 6,977,666 B1 * | 12/2005 | Hedrick | 345/690 |
| 7,030,892 B1 * | 4/2006 | Gyde et al. | 345/635 |
| 2003/0058136 A1 * | 3/2003 | Hedrick | 340/973 |
| 2004/0059472 A1 * | 3/2004 | Hedrick | 701/3 |

* cited by examiner

AIRCRAFT INSTRUMENT PANEL

CROSS REFERENCE TO RELATED APPLICATIONS

The present Application is based on International Application No. PCT/EP2003/050751, filed on Oct. 23, 2003, which in turn corresponds to FR 02/13405 filed on Oct. 25, 2002, and priority is hereby claimed under 35 USC §119 based on these applications. Each of these applications are hereby incorporated by reference in their entirety into the present application.

FIELD OF THE INVENTION

The invention relates to instruments for aiding the piloting of aircraft. More precisely, it relates to the instruments on board aircraft whose piloting requires, for technical reasons or for regulatory reasons, the presence of standby instruments to display essential navigation data in the event that the main display systems fail.

BACKROUND OF THE INVENTION

In a typical example, for a commercial aircraft transporting passengers, the aircraft instrument panel comprises amongst other things:
  a main display for displaying with great precision a horizon, an attitude of the aircraft, and altitude, heading and speed data; this display receives the information computed by a computer of the airplane based on data received from various sensors;
  a standby horizon, a standby altimeter, and a standby anemometer independent of the main system, for displaying in a more concise manner and with less precision a horizon, an altitude, a speed and where necessary some other data; the displayed information is computed by these independent instruments themselves, the latter receiving signals from sensors less sophisticated than those that are used for the main display; the standby horizon, the standby altimeter and the standby anemometer may be grouped together in an "integrated electronics standby instrument" which displays all the standby information on one and the same color screen. The sensors associated with the integrated electronics standby instrument may or may not be integrated into this instrument; if the primary display system fails, the pilot uses the data from the standby instruments.

The main display system is duplicated when the cockpit comprises a pilot station and a copilot station. The primary displays are duplicated but the standby instrument is not usually duplicated. It is placed on the pilot side.

Furthermore, aircraft intended to fly long distances may also have an automatic pilot system, and the instrument panel then comprises an item of equipment for automatic pilot control. This item of equipment comprises manual control buttons that the pilot actuates to set a desired heading, a desired altitude, a desired speed, and a desired climb or descent gradient (or instead of a desired gradient, a desired vertical climb or descent speed, which amounts to the same thing). The control buttons are used to actuate angle coders whose logic signals are processed in the control station to allow the generation of control signals representing the set points chosen by the pilot. These signals are sent to the automatic pilot computer which controls the trajectory of the aircraft. At the same time, these control signals are used in the control station itself to display therein, for the attention of the pilot or pilots, the set point values chosen manually by means of the control buttons.

Finally, in large sized commercial airplanes, for safety reasons, provision is made for all the electronics and the software for operating the automatic pilot computer to be duplicated; thus, if a failure occurs in one hardware or software element of a computing channel, the other channel can take over. The computer therefore comprises two computing channels (including two channels in the electronic elements of the automatic pilot control panel on the instrument panel), and a check of one of the channels by the other to constantly verify that there is no divergence in the processing carried out by the two channels.

The whole instrument panel is particularly costly when all the abovementioned requirements or even simply some of them must be satisfied. One aim of the invention is to make the instrument panel less costly.

SUMMARY OF THE INVENTION

According to the invention, the proposal is for an instrument panel which, in addition to a main display system for horizon and necessary piloting parameters, comprises two items of equipment identical from the point of view of hardware and the point of view of software, which are each provided with a display screen, automatic pilot control means (particularly buttons for adjusting set points given by the pilot), computing means and standby data (standby horizon, standby altitude, standby speed in principle) and means of displaying these data on the display screen.

In normal operating conditions, one of the items of equipment is configured in an "automatic pilot set point display" mode; its control buttons are then used to give the set points to the automatic pilot computer, and the set points are displayed on the screen. The other item of equipment is configured in "integrated standby data display" mode. It displays on the screen the standby horizon, the standby speed and the standby altitude which it computes based on signals supplied by sensors; the sensors, preferably, are not part of the equipment; they are outside the equipment and they supply their measurement signals simultaneously to the two items of equipment.

Since the items of equipment are identical, the production cost is lower. Furthermore, since the two items of equipment are identical, they can be used to satisfy the requirement for the presence of a dual computing channel for the automatic pilot. The equipment that displays the standby data has the computing software used for the "automatic pilot set point display" mode and this software runs, but without displaying the automatic pilot set points, even when the equipment is in "standby data display" mode. It receives the set points from the other item of equipment and processes them in order to send them independently of the other item of equipment to the automatic pilot computer.

In operating conditions in which one of the two items of equipment has failed, the other automatically configures itself in "automatic pilot set point display" mode. As a variant, since the two items of equipment have all that is necessary to display the standby data, the item of equipment that has not failed may display the automatic pilot data on one half of the screen and the standby data on the other. This is a degraded display mode, but is acceptable because it would be used only in case of failure.

Finally, in the event of dual piloting, with a pilot and a copilot, the display systems being placed between the pilot and the copilot, provision is preferably made for a switchover control button to be present on each of the items of equipment to invert the working modes of the two items of equipment depending on the person who has the helm: the pilot on the left will in principle require the equipment closest to him to be in piloting set point display mode and the equipment furthest from him to be in standby data display mode. When the copilot on the right takes the helm, he inverts the modes in order to require the equipment closest to him to be in automatic pilot set point display mode.

In summary, the invention proposes an aircraft instrument panel comprising on the one hand at least one main display system for horizon and necessary piloting parameters, and on the other hand an item of automatic pilot control equipment, which comprises manual piloting set point control buttons and finally an item of standby display equipment allowing the display, independently of the main display system, of integrated standby data including a standby horizon, characterized in that the automatic pilot control equipment and the standby display equipment are two identical items of equipment from the hardware point of view and the software point of view and each comprises a display screen capable of displaying the integrated standby data, and in that the two items of equipment have at least two operating modes, one of the modes being an integrated standby data display mode and the other being a mode of displaying the automatic pilot set points given by the pilot, the items of equipment each operating in a different mode in normal operating conditions.

The set points given by the pilot are entered via control buttons on the equipment that is in set point display mode. Preferably, these set points are sent at the same time to the two items of equipment, which process them in parallel to send the corresponding instructions, via two independent channels, to two independent computing systems of an automatic pilot computer with redundant computing channels.

The invention relates not only to an instrument panel thus constituted, but also to the integrated standby equipment itself, suitable for being installed on this instrument panel, the integrated standby equipment comprising both the hardware and the software capable of displaying on a single display screen either the standby data, including a standby horizon, when the equipment is operating in a standby data display mode, or automatic pilot set points when the equipment is operating in a piloting set point display mode, the equipment being provided with set point adjustment buttons.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other features and advantages of the invention will appear on reading the following detailed description made with reference to the appended drawings in which.

DETAILED DESCRIPTION OF THE INVENTION

Figure 1:
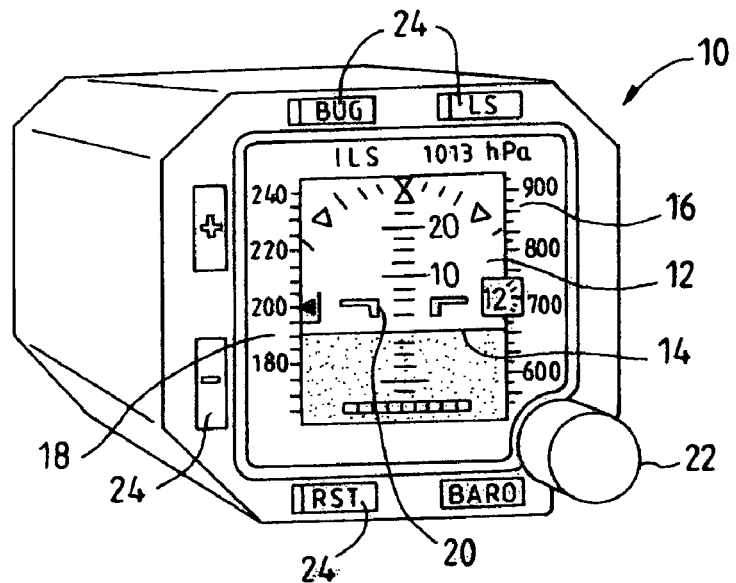
FIG. 1 represents an integrated standby instrument of the prior art.

FIG. 1 shows an integrated electronics standby instrument 10, which comprises a color screen 12 for the display of a horizon 14 (ground in brown below, sky in blue above) and standby data necessary for piloting, that is mainly altitude (scrolling graduated scale 16 on the right), speed (scrolling graduated scale 18 on the left), and an airplane attitude symbol 20. The horizon and data are displayed according to a computation made by the instrument based on signals originating from sensors some of which are outside the instrument and others of which may be inside or outside the instrument. The sensors are usually pressure sensors (for the speed and for the altitude) and an inertia measurement unit for the attitude.

The instrument usually comprises an adjustment button 22 used to reset the atmospheric pressure according to data communicated locally (for example supplied by the weather services close to an airport). It comprises other control buttons 24 serving various purposes (resetting the horizon, placing marks on the screen for authorized speed or altitude ranges, etc.). The instrument comprises electronic circuits and onboard software. It supplies information independent of that which is given by the main aircraft navigation aid systems.

Figure 2:
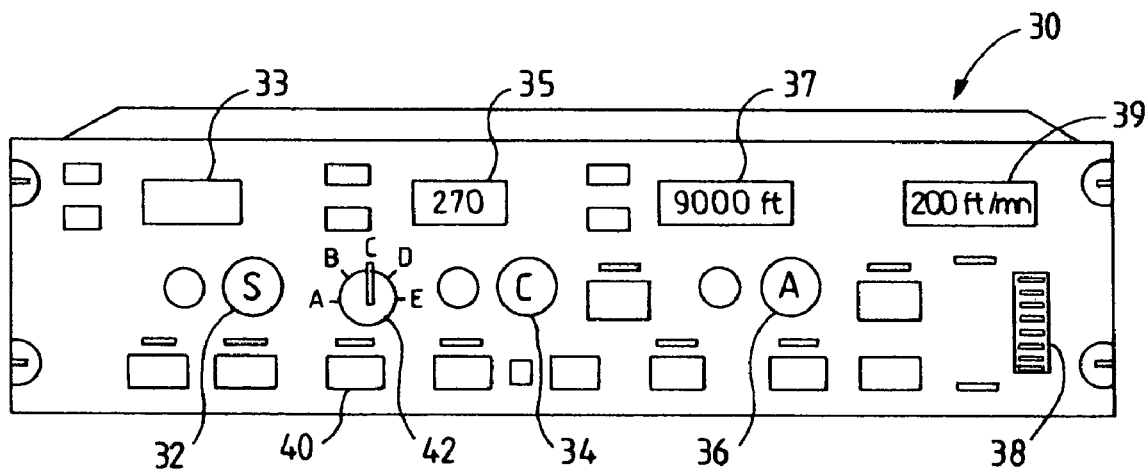
FIG. 2 represents an automatic pilot control panel of the prior art.

FIG. 2 represents an automatic pilot control station 30. It essentially comprises buttons for adjusting set point values given by the pilot to an automatic pilot computer present in the aircraft. And it comprises small screens for displaying the set point values entered, so that the pilot can check the action he takes on the buttons. For example, there are four set point buttons 32, 34, 36, 38 respectively for the aircraft speed, the heading and the track, the altitude and the climb or descent gradient (pitch). And there are four corresponding displays 33, 35, 37, 39, each beside the corresponding set point button.

The other control buttons of the automatic pilot control panel, numbered for example 40, 42, are automatic pilot engagement or disengagement buttons, piloting mode selection buttons, etc.

Figure 3:
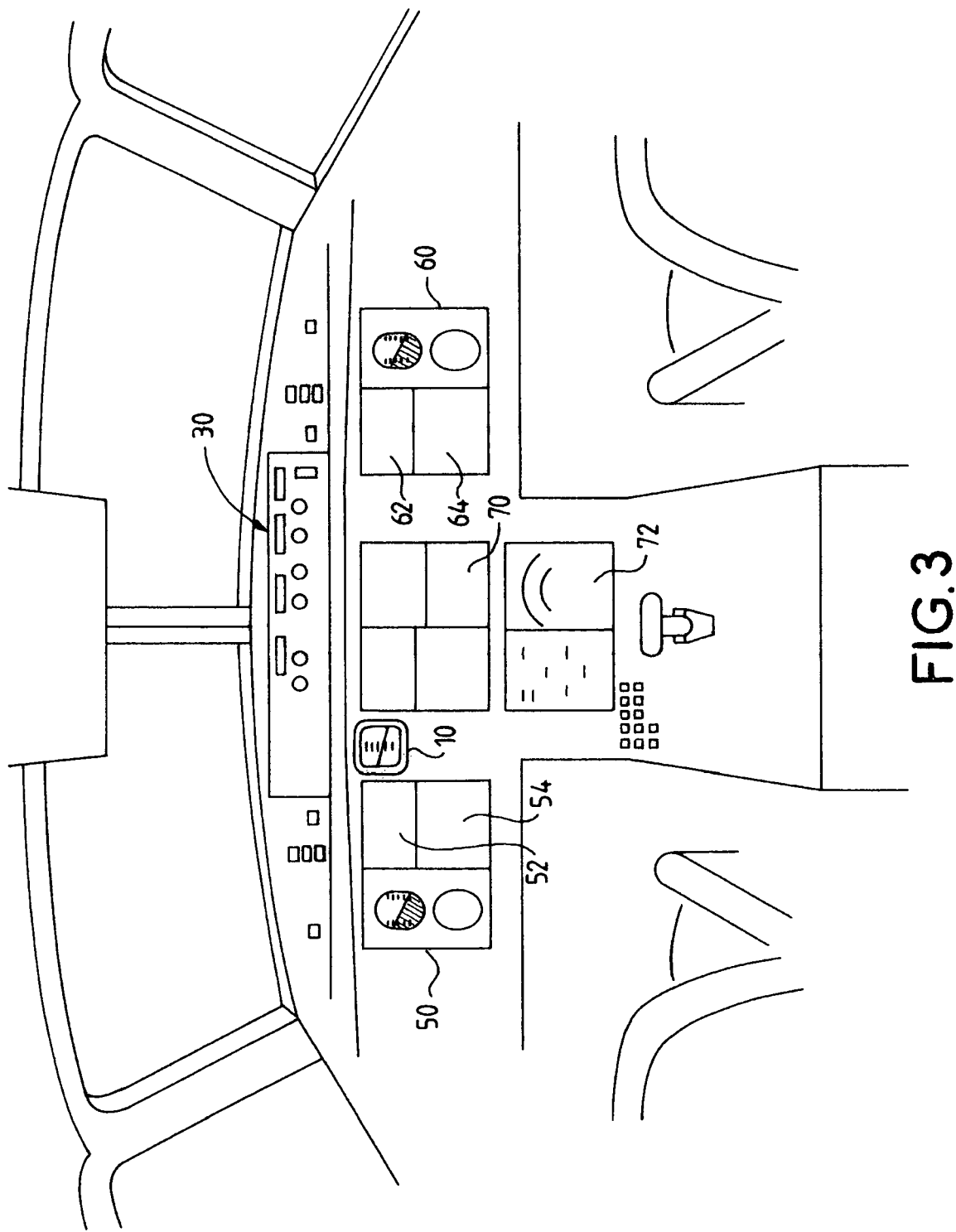
FIG. 3 represents an instrument panel combining the elements of FIGS. 1 and 2.

FIG. 3 represents a passenger transport airplane instrument panel, with pilot station and copilot station. The main display system comprises several piloting and navigation screens. For piloting, the horizon and piloting data are displayed on a screen 50 for the pilot and a screen 60 for the copilot. Other screens 52, 54, for the pilot, 62, 64 for the copilot, and 70, 72 (for the pilot and copilot combined) supply other indications useful for piloting or navigation. The integrated electronics standby instrument 10 is placed on the pilot side. The automatic pilot control panel 30 alone is placed above the array of piloting and navigation display systems. The pilot and copilot have access to the automatic pilot control panel which is in the center of the instrument panel in the upper portion of the latter. The automatic pilot set points are handled as has been said on two independent computing channels but based on a single control panel.

Figure 4:
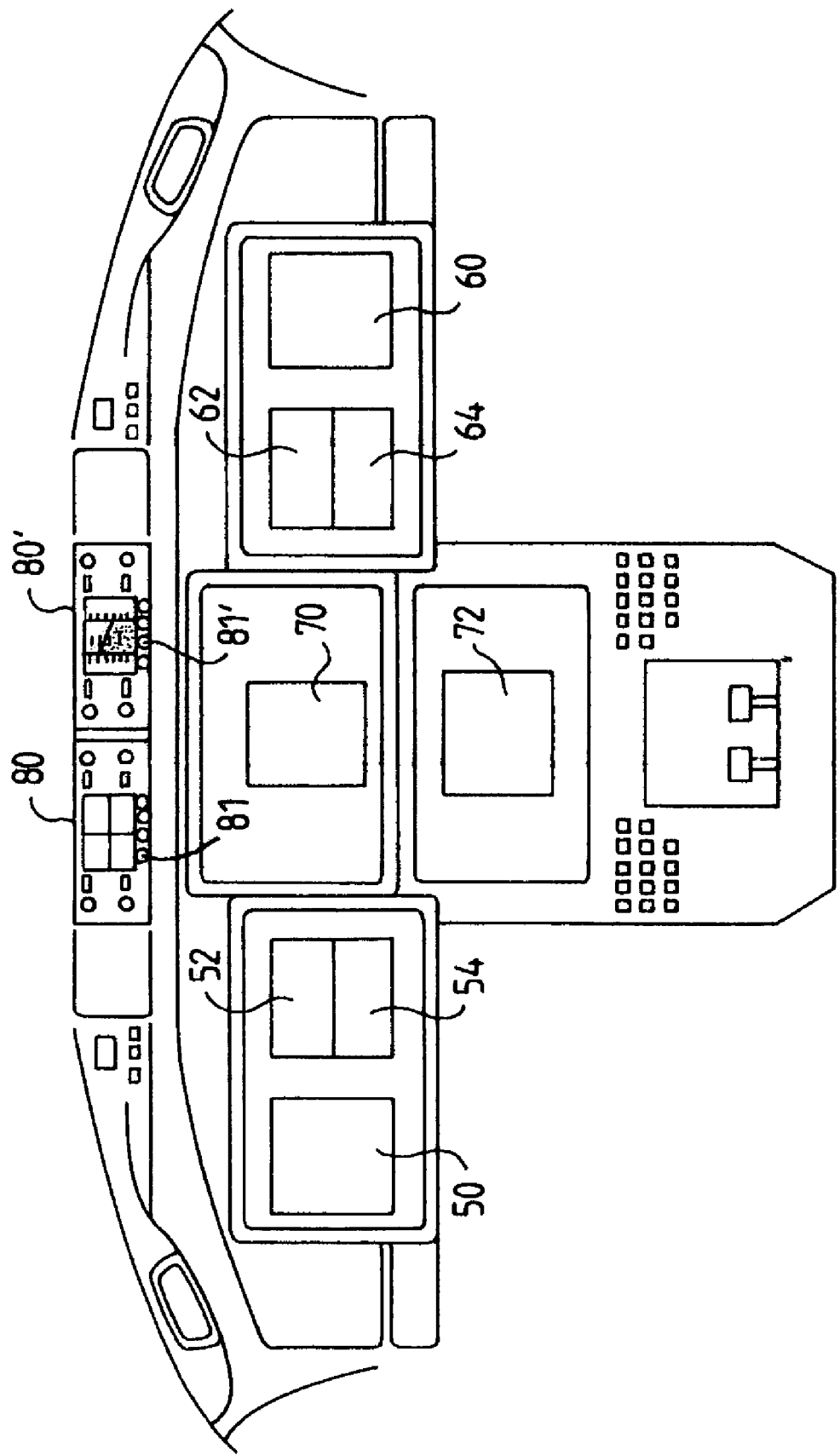
FIG. 4 represents an instrument panel according to the invention.

FIG. 4 represents an example of an instrument panel according to the invention. The main display systems, for piloting as for navigation are conventional and may be identical to those of FIG. 3: screens 50, 52, 54, 60, 62, 64, 70, 72. The integrated electronics standby instrument is now placed beside the automatic pilot control panel, above these main display systems. And the standby instrument and the automatic pilot control panel now consist of two identical and interchangeable items of equipment, both from the hardware point of view and the software point of view, and they are coupled together to be able to operate together in a consistent manner. These two items of equipment, side by side, are indicated here by reference numbers 80 and 80'.

In normal operating mode of the aircraft (no failure of the aircraft's main display system, and no failure of one or other of the items of equipment 80 and 80'), each item of equipment may perform both of the types of tasks for which it is designed: tasks of computing standby data on the one hand to play the role of integrated electronics standby instrument and tasks of automatic piloting to play the role of automatic pilot control panel; but, with respect to the display on their respective screen, they operate at a given moment in two different modes and not in one and the same mode: one displays the computed standby data but does not display the automatic pilot set point indications; the other does not display the standby data but displays indications specific to the automatic pilot and in particular the set points that are given by the pilot or copilot.

A switchover control button 81, 81' on each of the items of equipment 80 and 80' is used to switch the operating mode of the items of equipment to invert the roles. The equipment that was in the "standby data display" mode switches to the "automatic pilot set point display" mode, and vice-versa, at the command of the button for changing the mode of one or other of the items of equipment. This switchover is in practice carried out during a transition from piloting by the pilot (left seat of the airplane) to a piloting by the copilot (right seat), so that the person piloting has on his side the automatic pilot data display (in normal operating conditions with no failure). The mode switchover button of one of the items of equipment therefore acts on the one hand to invert the mode of that item of equipment and on the other hand to send a mode inversion signal to the other identical item of equipment.

The action on the set point control buttons of the equipment that is in piloting set point display mode (for example equipment 80) causes this item of equipment to compute data for sending to the airplane automatic pilot computer, but also to display the set point data required by this action. And, simultaneously, the signals originating from the control buttons of this item of equipment are transmitted to the other item of equipment (80'), which generates in the same manner signals for sending to the automatic pilot computer. The signals originating from the item of equipment 80 and 80', for sending to the computer, may therefore be generated independently (irrespective of the action on the control buttons which is a unique action) and transmitted to two independent channels of the automatic pilot computer. This makes it possible to satisfy an automatic pilot safety requirement, in the form of an independent processing by two distinct items of equipment when the two items of equipment display different information intended for the pilots.

If the main display systems fail, the pilot has the choice, via the display switchover control button, of placing close to him the standby data display or of keeping close to him the automatic pilot control display. In the landing approach phase, he will place the standby data display close to him.

In the event of failure of one of the two items of equipment 80 and 80', the equipment that is still operating will, as a matter of course, be placed in automatic pilot set point display mode, if it is not already in that mode, so that the pilot retains control of the piloting mode and that of the set points that he gives.

It is assumed that the main display systems and an item of equipment 80 and 80' are not simultaneously failed, in which case the standby data would be lost. However, even in this case, the pilot may, in the landing phase and after selecting manual pilot mode, switch back the item of equipment 80 or 80' that has not failed to the standby data display mode.

As a variant, if an item of equipment 80 or 80' fails, provision can be made for the item of equipment that has not failed to switch to a third display mode, which is a degraded mode, in which one portion of the screen displays the standby data and another portion displays the automatic pilot data.

Figure 5:
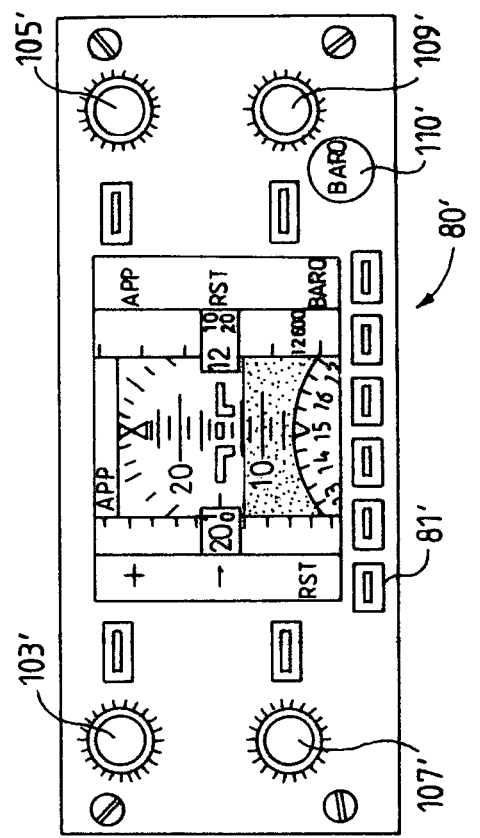
FIG. 5 represents in greater detail a possible configuration of the two identical items of equipment of the invention, when they are operating one in an automatic pilot set point display mode and the other in a standby data display mode.
Figure 5:
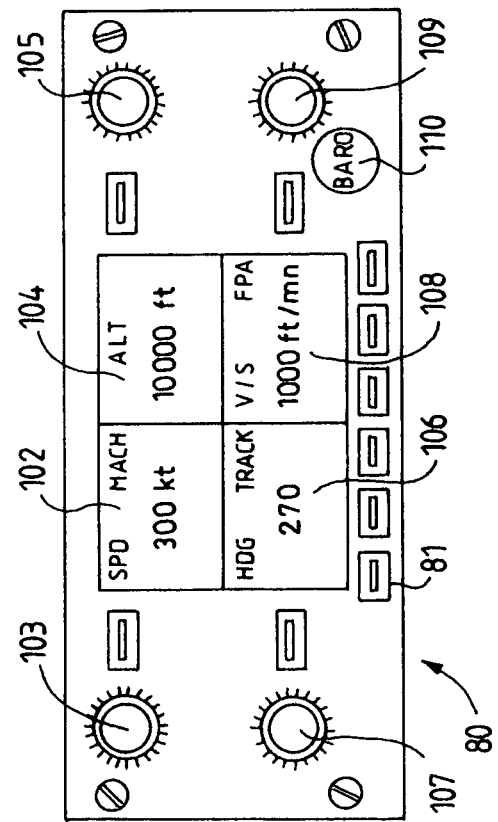

FIG. 5 represents side by side the two items of equipment 80 and 80' according to the invention, in normal operating conditions, that is to say one displaying the automatic pilot data and the other displaying the standby data and in particular the standby horizon.

The screen of the item of equipment 80 displays the same indications as the integrated electronics standby instrument 10 of FIG. 1. The screen of the item of equipment 80' displays in particular the automatic pilot set points given by the pilot. These set points are displayed in a form different from that of the prior art since there are no longer any small individual displays placed beside each set point adjustment button as was the case for example in FIG. 2. The set points are now displayed on a large screen which can for example be divided (in piloting set point display mode) into four zones 102, 104, 106, 108, corresponding to four different set points. Each zone is close to a respective set point adjustment button 103, 105, 107, 109.

Amongst the control buttons of the item of equipment 80 or 80', there are therefore at least four piloting set point control buttons, respectively for the speed (top left), the heading (bottom left), the altitude (top right) and the vertical speed (bottom right). There is also a rotating adjustment button 110, 110' which is used for resetting the local atmospheric pressure for the altimeter function present in standby data display mode. Various additional buttons, pushbuttons or switches, may be used, linked with the information displayed by the software on the screen, to perform various functions similar to those of the integrated electronics standby instruments of the prior art (placing max or min speed marks for example) or to those of the automatic pilot control panels of the prior art (selecting engagement or disengagement of the automatic pilot, selecting the automatic pilot mode, etc.). For the pilot, the functions of these buttons are defined by software in direct relation with the indications displayed on the screen, so that the same buttons may be used for a number of different functionalities, including functionalities belonging to the two different modes of the equipment.

The set point adjustment control buttons are in any case active (that is to say that they are executing a set point adjustment) only on the equipment that is in the piloting set point display mode. On the other item of equipment, they are inactive, that is to say that rotating them does not change the piloting set points. They may however be active for another function linked to the standby data display, but this is not usually desirable for reasons of safety.

Thus, in the example described, preference has been given to providing on the equipment a specific button 110, 110' for resetting atmospheric pressure, even though in theory one of the set point adjustment buttons 103 to 109 could be used for this reset since these buttons define no set point when the equipment is in standby data display mode. The specific button 110, 110' is not active for carrying out an atmospheric pressure reset unless the equipment is in standby data display mode.

In the case of commercial passenger transport airplanes, thanks to the invention, the automatic pilot safety requirements are satisfied ($10^{-6}$ failures per hour, a rate obtained thanks to redundancy) and those of the standby functions ($10^{-3}$ failures per hour), with a simplified instrument panel architecture.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An aircraft instrument panel, comprising a main display system for horizon and necessary piloting parameters, and on the other hand an item of automatic pilot control equipment, which comprises manual piloting set point control buttons and finally an item of standby display equipment allowing the display, independently of the main display system, of integrated standby data including a standby horizon,
wherein the automatic pilot control equipment and the standby display equipment are two identical items of equipment from the hardware point of view and the software point of view and each comprises a display screen capable of displaying the integrated standby data, and in that the two items of equipment have at least two operating modes, one of the modes being an integrated standby data display mode and the other being a mode of displaying the automatic pilot set points given by the pilot, the items of equipment each operating in a different mode in normal operating conditions.

2. The instrument panel as claimed in claim 1, wherein the set point control buttons are active on the equipment that is in piloting set point display mode and inactive as control buttons for set point adjustment on the equipment that is in standby data display mode.

3. The instrument panel as claimed in claim 1 wherein the control buttons of the item of equipment that is in piloting set point display mode allow the establishment of set point adjustment signals that are also transmitted to the other item of equipment, which also processes these signals without however displaying the set points.

4. The instrument panel as claimed in claim 1 wherein each of the two items of equipment comprises a switchover control button which is used to invert the operating modes of the two items of equipment.

5. The instrument panel as claimed in claim 1, wherein means are provided, in the event of the failure of one of the two items of equipment, for switching the other item of equipment to automatic pilot set point display mode if it is not already in that mode.

6. The instrument panel as claimed in claim 1, wherein the items of equipment comprise a control button distinct from the piloting set point adjustment buttons, for resetting the atmospheric pressure for the purpose of an altitude computation, this button being active for the resetting of pressure only when the equipment is in standby data display mode.

7. An integrated item of standby equipment intended to be mounted on an instrument panel as claimed in one of the preceding claims wherein it comprising both the hardware and software capable of displaying on a single display screen either standby data, including a standby horizon, when the equipment is operating in a standby data display mode, or automatic pilot set points when the equipment is operating in a piloting set point display mode, the equipment being provided with piloting set point adjustment buttons.

8. The equipment as claimed in claim 7, wherein it comprising an atmospheric pressure reset button, active when the equipment is in standby data display mode.

9. The equipment as claimed in claim 8, wherein the equipment has a mode switchover button, active for inverting the equipment operating mode and capable of sending a mode inversion signal to another identical item of equipment of the same instrument panel.

10. The instrument panel as claimed in claim 2, wherein the control buttons of the item of equipment that is in piloting set point display mode allow the establishment of set point adjustment signals that are also transmitted to the other item of equipment, which also processes these signals without however displaying the set points.

11. The instrument panel as claimed in claim 2, wherein each of the two items of equipment comprises a switchover control button which is used to invert the operating modes of the two items of equipment.

12. The instrument panel as claimed in claim 3, wherein each of the two items of equipment comprises a switchover control button which is used to invert the operating modes of the two items of equipment.

13. The instrument panel as claimed in claim 2, wherein means are provided, in the event of the failure of one of the two items of equipment, for switching the other item of equipment to automatic pilot set point display mode if it is not already in that mode.

14. The instrument panel as claimed in claim 3, wherein means are provided, in the event of the failure of one of the two items of equipment, for switching the other item of equipment to automatic pilot set point display mode if it is not already in that mode.

15. The instrument panel as claimed in claim 4, wherein means are provided, in the event of the failure of one of the two items of equipment, for switching the other item of equipment to automatic pilot set point display mode if it is not already in that mode.

16. The instrument panel as claimed in claim 2, wherein the items of equipment comprise a control button distinct from the piloting set point adjustment buttons, for resetting the atmospheric pressure for the purpose of an altitude computation, this button being active for the resetting of pressure only when the equipment is in standby data display mode.

17. The instrument panel as claimed in claim 3, wherein the items of equipment comprise a control button distinct from the piloting set point adjustment buttons, for resetting the atmospheric pressure for the purpose of an altitude computation, this button being active for the resetting of pressure only when the equipment is in standby data display mode.

18. The instrument panel as claimed in claim 4, wherein the items of equipment comprise a control button distinct from the piloting set point adjustment buttons, for resetting the atmospheric pressure for the purpose of an altitude computation, this button being active for the resetting of pressure only when the equipment is in standby data display mode.

19. The instrument panel as claimed in claim 5, wherein the items of equipment comprise a control button distinct from the piloting set point adjustment buttons, for resetting the atmospheric pressure for the purpose of an altitude computation, this button being active for the resetting of pressure only when the equipment is in standby data display mode.

* * * * *